(No Model.)
G. VON PRITTWITZ PALM.
DEVICE FOR PRODUCING OPTICAL ILLUSIONS.
No. 498,524. Patented May 30, 1893.
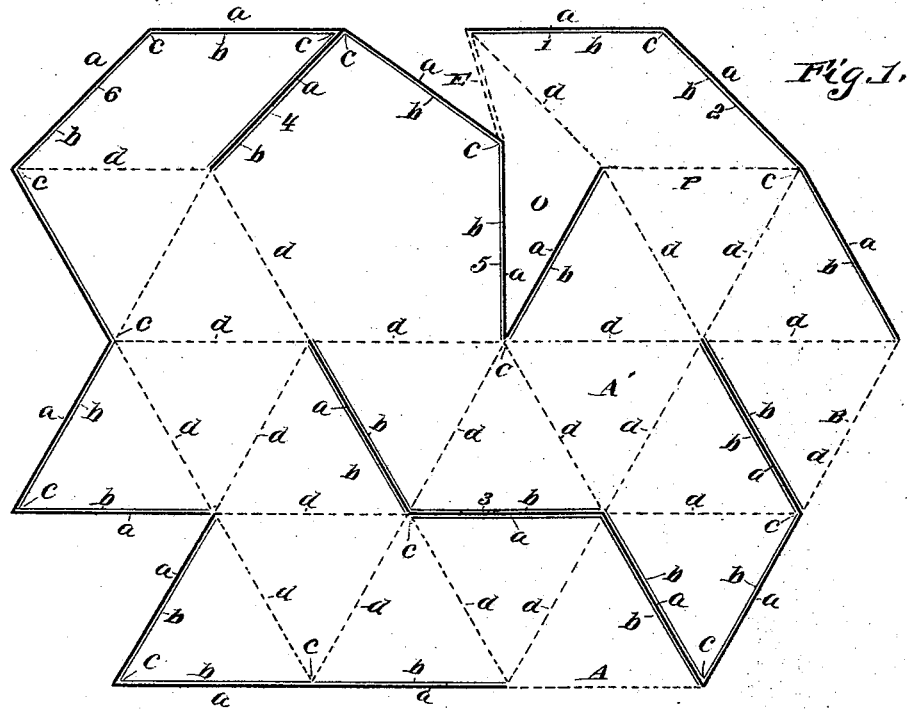
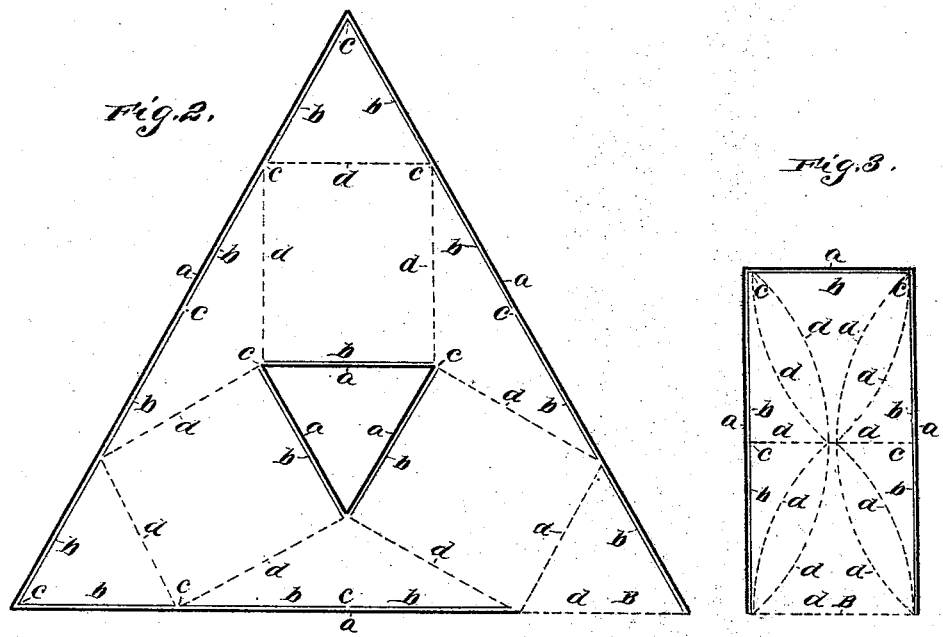
WITNESSES:
INVENTOR
Gustav von Prittwitz Palm
BY
ATTORNEY.

UNITED STATES PATENT OFFICE.

GUSTAV VON PRITTWITZ PALM, OF NEW YORK, N. Y.

DEVICE FOR PRODUCING OPTICAL ILLUSIONS.

SPECIFICATION forming part of Letters Patent No. 498,524, dated May 30, 1893.

Application filed November 28, 1892. Serial No. 453,342. (No model.)

*To all whom it may concern:*

Be it known that I, GUSTAV VON PRITTWITZ PALM, a subject of the Emperor of Austria-Hungary, residing at New York, in the county of New York and State of New York, have invented certain new and useful Improvements in Devices for Producing Optical Illusions; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in means or devices for producing optical illusions. Chambers or galleries in which spectators are by multiple reflection of themselves and their surroundings misled, are well-known under the name of "mirror mazes." This invention belongs to the same class. By it new effects are obtained. Upon entering the gallery constructed in accordance with my invention the spectator sees at a distance but apparently within easy access, an object such as a counter with a sales-woman or any suitable attraction. Upon approaching the same he suddenly finds himself stopped and discovers that he only saw a reflection. When under the impulse natural in these circumstances he turns around he sees the same person or object directly at his back and much nearer; approaching this he again finds himself before a mirror and whichever way he tries to get at the object or person so shown he will be baffled.

This invention is shown in the annexed drawings in which—

Figure 1 is a ground plan of the principal building or chamber. Fig. 2 is a ground plan of a triangular chamber. Fig. 3 shows an arrangement of arches I may also adopt.

In all the figures the heavy lines such as *a a* show the walls or partitions, the thinner ines *b b* show mirrors and the breaks *c c* in the thin lines show the points of junction of the mirror. The dotted lines *d d* indicate the arrangement of the arches.

As seen in Fig. 1, I place the counter or other object or a person in suitable surroundings, hereinafter called the attraction, at a convenient point O. In front I place the mirrors 1 and 2. At suitable angles therefrom I place other mirrors of equal size. Now the attraction is reflected in the mirrors 1 and 2 fronting it and the reflection from mirror 2 is thrown into the mirror 3 which forms an angle of 45° (forty-five degrees) with mirror 2. From the mirror 3 the image is reflected into the mirror, 4 from mirror 4 to mirror 5 and also from 3 into 6. Now the visitor upon entering at A, finds himself in a "maze" passage. Looking in front of him he perceives a number of visitors but on examination he will find that what may appear to him numerous persons, are only reflections of the same individual standing behind the mirror 3. In like manner he is seen by the other visitors. In fact any visitor in any part of the "maze" is seen reflected in every other part of the "maze." Not so the "attraction." This will be seen exclusively in the mirrors 1, 2, 3, 4, 5, and 6. Thus two distinct illusions are produced, the one that the locality is enormous in extent and filled with visitors, the other that the "attraction" is comparatively speaking near the visitor and easily accessible. This double illusion is caused by the particular arrangement illustrated in Fig. 1. It will on examination be found that the mirrors 2 and 3, 3, and 4, 4 and 5, and 3 and 6, form angles of 45° (forty-five degrees) but do not face any other mirrors while all the other mirrors form angles of 60° (sixty degrees) and 120° (one hundred and twenty) with one another and each of these face one or more of the others. The visitor when reaching the second passage A' sees the "attraction" before him in mirror 2 slightly toward one side. On following it up he ultimately reaches the plain sheet of glass P or other transparent material at the end of said passage and thereby is prevented from reaching the attraction. The mirror causes the plain sheet P to be undistinguishable from the other mirrors. At B. Fig. 1 the exit is placed while E shows where a door is placed to admit into the place behind plate P.

In one part of the "maze" I may arrange the kaleidoscopic chamber shown in Fig. 2. Such chamber heretofore consisted of a simple equilateral triangle lined with mirrors. According to this part of my invention however, I place within such outer triangle another equilateral triangle covered with mirrors the sides of the inner facing the angles of the outer. This produces the same highly interesting novel effect of showing each visitor every other person within the chamber by reason of the multiplicity of the reflection obtained.

In arranging the "maze" I may have a room or gallery forming an equilateral quadrangle such as shown in Fig. 3. The arches are made up of double curves there being one column in the center and one (or its representation) in each corner. The central column is joined to each corner by one of the double curved arches and the whole has the appearance of an immense chamber with columns and arches arranged on a geometrical pattern. The double curved arches are applicable to mazes of all kinds.

In another and pending application filed by me for Letters Patent for improvements in devices for producing optical illusions, December 17, 1892, Serial No. 455,500, a mirror maze is shown consisting of an inclosed space having the inner side of its walls lined with mirrors, arranged at angles to each other, and partitions within forming passages. Such I do not claim in the herein application, the same being shown, described and claimed in said application, Serial No. 455,500.

What I claim is—

1. A mirror maze consisting of an inclosed space provided with an opening, mirrors arranged within the same at angles forming passage ways, a transparent plate forming an obstruction to one of said passages, a mirror behind said transparent plate adapted to reflect an object through the same, and an object placed behind said plate, said object being located so that it cannot be reached through said passage way, all said parts being combined substantially as described.

2. A mirror maze consisting of an inclosed space with mirrors on the inner sides of the walls thereof, partitions in said inclosed space having mirrors thereon and forming passage ways in said inclosure, a portion of said mirrors being arranged at an angle of forty-five degrees with respect to each other, and other mirrors placed at an angle of sixty degrees to each other, the first set of mirrors reflecting only to and from each other, and the second set of mirrors reflecting all around the inclosed space, a transparent plate forming an obstruction to one of said passage ways, an object located behind said plate, and a mirror or mirrors adapted to reflect said object through said transparent plate on one of said first set of mirrors, all said parts being combined substantially as described.

3. A mirror maze having a transparent plate forming an obstruction to a passage way, a mirror behind said transparent plate adapted to reflect an object through the same on a mirror within said maze, and an object within the inclosure formed by the transparent plate and said mirrors, said object not being accessible through said passage way, all said parts being combined substantially as described.

4. A mirror maze having near the end of one of its passages a transparent plate, and provided with a mirror or mirrors behind said plate reflecting an object through the same on a mirror within said passage, said object being located so as to be non-accessible through the said passage, said parts being combined substantially as described.

5. In a mirror maze, a chamber lined with mirrors on its walls, and double curved arches within the passage ways of the same, said parts being combined substantially as described.

GUSTAV VON PRITTWITZ PALM.

Witnesses:
 ROBT. AITON,
 T. A. AITON.